Nov. 13, 1956     W. B. PARVIN     2,770,135

MEASURING AND MIXING SPOON

Filed Jan. 25, 1954

*INVENTOR.*
WINIFRED B. PARVIN
BY
*Jewett, Mead, Browne & Schuyler*
                *ATTORNEYS*

United States Patent Office

2,770,135
Patented Nov. 13, 1956

2,770,135

MEASURING AND MIXING SPOON

Winifred B. Parvin, San Antonio, Tex.

Application January 25, 1954, Serial No. 405,678

3 Claims. (Cl. 73—426)

This invention relates to a measuring and mixing spoon and more particularly to a spoon useful for measuring two commonly required amounts of shortening or the like and mixing the measured amount with other ingredients used in cooking or baking.

The present invention is directed to the problem of providing a utensil which will enable the housewife to measure quickly and accurately shortening or other substances of like texture used in cooking and then mix the measured amount with other ingredients used in cooking, the term cooking including baking or the like. It is, of course, known to utilize utensils such as measuring spoons and measuring cups in measuring various ingredients used in cooking. However, when a conventional measuring cup is used to measure shortening or the like, it is necessary to fill the cup with the shortening, then scrape the shortening out of the cup and use still another utensil to actually mix the shortening with other ingredients. Similarly, known types of measuring spoons are useful only for measuring and do not in and of themselves provide a ready utensil to accomplish mixing the shortening with other ingredients. Obviously, where a separate utensil is needed to measure the shortening and another utensil needed to mix it with other ingredients, the housewife has more utensils to clean.

It is therefore an object of the present invention to provide a new and improved spoon useful for measuring shortening or the like and mixing the measured amount of shortening or the like with other ingredients used in cooking.

It is a further object of the present invention to provide such a spoon which may be utilized to measure quickly and accurately at least two amounts of shortening or the like commonly required in many recipes.

Briefly described, a preferred embodiment of the present invention is a spoon bowl having a continuous rim and a volume, when leveled off at the rim, of one-third or one-fourth of a cup. Oppositely disposed notches are provided in the bowl rim toward the front end of the bowl and a groove extends across the inner, upper surface of the spoon bowl between the notches. When a scraper blade in inserted edgewise into the spoon bowl, the notches serve to locate the blade rapidly and accurately and when it comes into contact with the groove, the scraper blade divides the leveled off volume into two volumes of one-fourth of a cup and one-twelfth of a cup respectively, assuming of course that the spoon bowl volume is one-third of a cup. The one-twelfth of a cup volume is at the front end of the spoon bowl and by moving the scraper blade toward the front it is possible to quickly and accurately remove one-twelfth of a cup of shortening or the like from the spoon bowl leaving one-fourth of a cup remaining in the bowl. It is apparent therefore that the spoon can be then used to mix the one-fourth of a cup with other ingredients of the particular recipe being followed and that the measuring can be repeated to obtain multiple amounts of the one-third of a cup amount or the one-fourth of a cup amount. Obviously, one-third cup can be obtained readily by running a straight edge across the rim to level it off.

Other objects and advantages of the present invention will become more apparent from the following detailed description taken in conjunction with the attached drawing in which.

Figure 1:
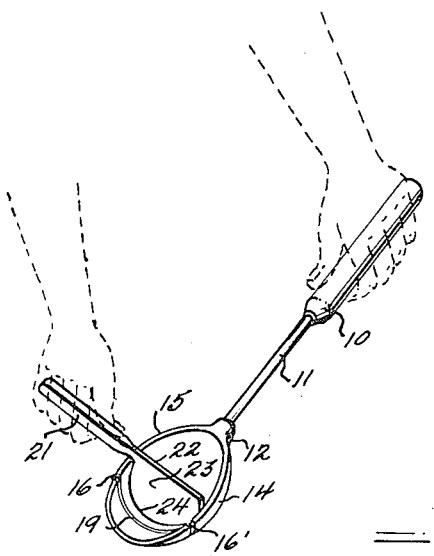
Fig. 1 is a perspective view showing a preferred embodiment of a measuring and mixing spoon according to the present invention, a scraper blade being shown as being utilized in conjunction with the spoon.
Figure 2:
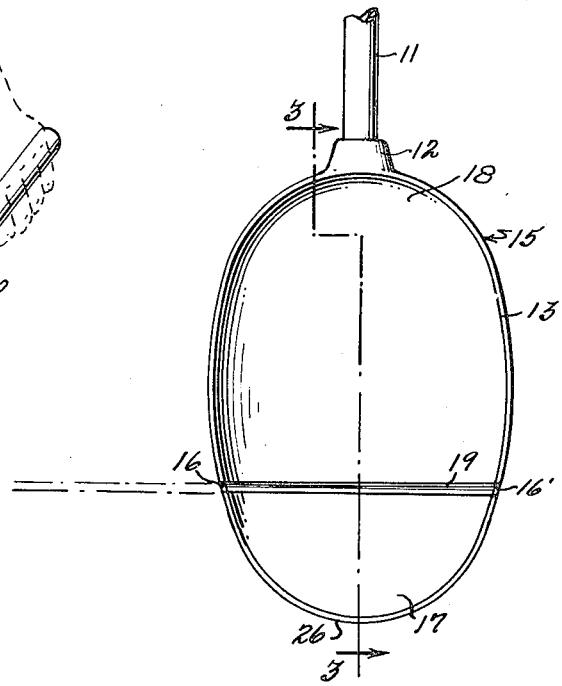
Fig. 2 is an enlarged top plan view of the spoon bowl including a portion of the handle.
Figure 3:
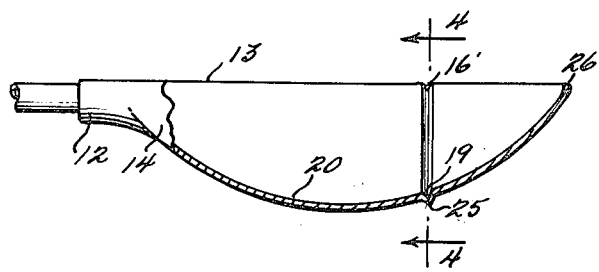
Fig. 3 is a sectional view taken on line 3—3 of Fig. 2.
Figure 4:
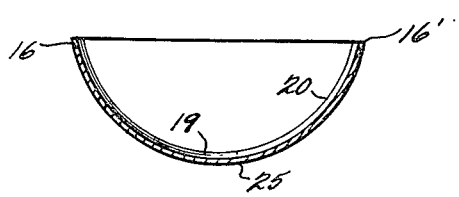
Fig. 4 is a sectional view taken on line 4—4 of Fig. 3.

In accordance with a preferred embodiment of the invention, the measuring spoon has a handle 10 secured at one end to a shank 11. The other end of the shank is integrally joined with a projection 12 which extends from the spoon bowl, designated generally by the reference numeral 15. Although in the preferred form of the invention the shank and spoon bowl are made of metal and are integral with each other while the handle 10 is made of wood, plastic, etc., it is readily appreciated that these three elements may be made separately and then attached together or else the whole device may be formed from one piece of metal, plastic, etc. without deviating from the spirit or scope of this invention.

Located on each side of the rim 13 of spoon bowl 15 are two notches 16, 16' in the rim which are diametrically opposite to each other. Thus, a hypothetical line drawn from notch 16 to notch 16' would be substantially perpendicular to a vertical plane passing through the spoon bowl 15 and including the shank 11.

Assuming the volume or capacity of the spoon bowl 15 to be one-third of a cup when leveled off at the rim, which is the amount of shortening commonly required in many recipes, the notches 16, 16' are so located upon the rim 13 that when the portion of the material within the spoon bowl extending from the notches to the front edge 26 of the bowl is removed, the remaining amount of material within the spoon bowl is exactly one-fourth of a cup. Thus, by using this invention the housewife can readily scoop out a spoonful of shortening from a can, level it off by running a straight edge, such as the back of a knife, across the rim 13 of the spoon bowl and have exactly a third of a cup of shortening. She can quickly and easily remove the shortening from the front end 17 of the spoon beginning from the notches 16, 16' and have a quarter of a cup remaining. It is apparent that the V-shaped notches 16, 16' provide a visual, external means for the housewife and aid her in determining the exact location on the spoon from where the shortening should be scraped out of the spoon bowl 15 in order to have one-fourth of a cup of shortening remaining in the spoon. The notches are thus locator means.

To further increase the accuracy of the measuring spoon 15 in obtaining a smaller predetermined quantity than the predetermined quantity of the spoon bowl as a whole, a linear groove or depression 19 is provided in the inner concave or upper surface 20 of the spoon bowl. This groove extends downwardly from the V-shaped notch 16 across the concave surface 20 and upwardly to the V-shaped notch 16'. The groove 19 thus assumes a concave curvature corresponding to the curvature of the inner surface 20 of the spoon bowl.

When the measuring spoon 15 is full and leveled off so as to hold one-third of a cup of shortening or other similar material, and the housewife needs only one-fourth of a cup of that material, she may use a scraper such as that shown in Fig. 1 having a handle 21 integral with the upper straight edge 22 of a substantially semicircular blade 23. By pressing the blade 23 of the scraper straight downwardly along a hypothetical line drawn from notch 16 to notch 16' until the curved edge 24 of the blade 23 substantially fits into the groove 19 at the bottom of the bowl, the housewife has divided the contents of the measuring spoon so as to have one-fourth of a cup of shortening in the area 18 of the spoon extending from the notches 16, 16' toward the handle 10, and one-twelfth of a cup within the area 17 extending from the notches 16, 16' to the front edge 26 of the bowl. It is apparent that the notches and the groove provide a means of locating a planar member edgewise in the spoon bowl to divide the leveled off volume into two volumes of predetermined volume relation to each other. It is also apparent that if the measuring spoon has a volume, when leveled off, of one-fourth of a cup, then this particular volume can likewise be divided into two volumes of predetermined volume relation to each other in accordance with the teaching of the present invention.

To scrape out the one-twelfth of a cup of shortening in the forward end of the bowl, the housewife lifts the scraper until the curved edge 24 clears the groove 19 and then scrapes the shortening before it out of the spoon bowl. A knife or other similar utensil may also be used to satisfactorily remove the undesired portion of the shortening from the measuring spoon by merely running the blade along the groove in the inner surface of the bowl to divide the contents of the spoon into two portions, and then removing the portion from the front end of the spoon by scraping. The groove 19 can be formed in the bowl during its manufacture by any known stamping process. This results in a linear protuberance 25 on the convex surface 14, which corresponds to the groove 19 and which further aids the housewife in determining the location of the groove which is covered by shortening during use of the spoon.

It is apparent that whether one-fourth of a cup or one-third of a cup of shortening or the like is left in the spoon bowl, the amount left can then be mixed with other ingredients of the particular recipe being followed by using the spoon itself as the mixing instrument. It is therefore unnecessary to remove the measured amount and utilize a separate mixing instrument as is the case with a measuring cup, for example.

It has been stated that the notches 16, 16' facilitate locating a scraper blade so that the blade can be inserted edgewise into the spoon bowl. While the notches are a preferred means of accomplishing this result, other locator means coming within the spirit and scope of the present invention may be provided on the spoon bowl rim to locate a scraper blade in the manner described. Likewise, other means may be provided in lieu of groove 19 to serve to further locate the downwardly extending edge of the scraper blade as it is inserted into the spoon bowl.

A measuring spoon according to the present invention has the further advantage that it can be produced cheaply, i. e., in a stamping operation, if desired, wherein the groove 19 and notches 16, 16' may be formed in one operation.

While I have described and illustrated a preferred embodiment of my invention, I wish it to be understood that I do not intend to be restricted solely thereto but that I do intend to cover all modifications thereof which would be apparent to one skilled in the art and which come within the spirit and scope of my invention.

What I claim as my invention is:

1. A measuring and mixing spoon useful for measuring shortening or the like and mixing said shortening with other ingredients used in cooking, said spoon comprising a bowl having a continuous rim, said bowl having a predetermined volume when leveled off at said rim, said rim having a pair of notches therein and said bowl having an upper surface including a groove extending across said upper surface between said notches, said notches facilitating inserting a scraper blade edgewise into said bowl to bring an edge of said blade into contact with said groove, said blade, when positioned in contact with said notches and said groove, dividing said leveled off volume into two volumes of predetermined volume relation to each other.

2. A measuring and mixing spoon useful for measuring shortening or the like and mixing said shortening with other ingredients used in cooking, said spoon comprising a bowl having a continuous rim and a predetermined volume when leveled off at said rim, said rim having a pair of notches therein and said bowl having an upper surface including means extending across said upper surface between said notches to facilitate positioning a scraper blade in said bowl to divide said leveled off volume into two volumes of predetermined volume relation to each other, said scraper blade being adapted to be received in said bowl and having a scraper edge adapted to contact said upper surface means throughout the extent of said means.

3. A measuring and mixing spoon useful for measuring shortening or the like and mixing said shortening with other ingredients used in cooking, said spoon comprising a bowl having a continuous rim and a predetermined volume when leveled off at said rim, said rim having a pair of notches therein to facilitate inserting a scraper blade edgewise into said bowl, and said bowl having an upper surface including means extending across and out of said upper surface between said notches, said notches and said means being engageable by a scraper blade to divide said leveled off volume into two volumes of predetermined volume relation to each other, said scraper blade being adapted to be received in said bowl and having a scraper edge adapted to engage said bowl surface means throughout the extent of said means.

References Cited in the file of this patent

UNITED STATES PATENTS

| | | |
|---|---|---|
| 510,286 | Osterman | Dec. 5, 1893 |
| 597,188 | Nance | Jan. 11, 1898 |
| 2,165,642 | Mayer | July 11, 1939 |
| 2,645,127 | Parks | July 14, 1953 |